Feb. 3, 1970    A. GRUPP    3,492,919
TOOL SUPPORTING MEANS OF A PLANING MACHINE
Filed Dec. 21, 1967    4 Sheets-Sheet 1

Inventor:
Alfons Grupp
By: B. Eshlinger
Attorney

Feb. 3, 1970     A. GRUPP     3,492,919
TOOL SUPPORTING MEANS OF A PLANING MACHINE
Filed Dec. 21, 1967     4 Sheets-Sheet 4

Inventor:
Alfons Grupp
By:
[signature]
Attorney

United States Patent Office 3,492,919
Patented Feb. 3, 1970

3,492,919
TOOL SUPPORTING MEANS OF A
PLANING MACHINE
Alfons Grupp, Eislingen, Wurttemberg, Germany, assignor to Gebr. Boehringer G.m.b.H., Goppingen, Wurttemberg, Germany, a limited-liability company of Germany
Filed Dec. 21, 1967, Ser. No. 692,350
Claims priority, application Germany, Dec. 27, 1966,
B 90,486
Int. Cl. B23d 13/02
U.S. Cl. 90—54                                      3 Claims

ABSTRACT OF THE DISCLOSURE

A planing machine having a reciprocating work table, a stationary support and a slidable tool support thereon is provided with a tool-carrying member which is mounted on the slidable tooth support for back-and-forth movement between a cutting position for the cutting stroke of the work table and a retracted position for the return stroke of the work table. This tool-carrying member may be a flat block mounted on the slidable tool support for pivotal movement about an axis extending transversely to the movement of the work table. The cutting tool is adjustably clamped to a bracket and this bracket is easily detachably mounted on the tool-carrying member in a predetermined position relatively thereto. Therefore, the bracket provided with the cutting tool can be detached from the tool-carrying member and can be brought to a conveniently located work station where the cutting tool can be adjusted on the bracket and then clamped thereto in adjusted position. Thereafter, the bracket is attached again to the tool-carrying member by an easy manipulation whereupon the tool will be in the correct position relative to the slidable tooth support. In this manner a complicated tool adjusting operation is avoided which would be rendered difficult by the restricted accessibility of the tool, if this operation were carried out in the planing machine rather than on a separate work station.

---

Figure 1:
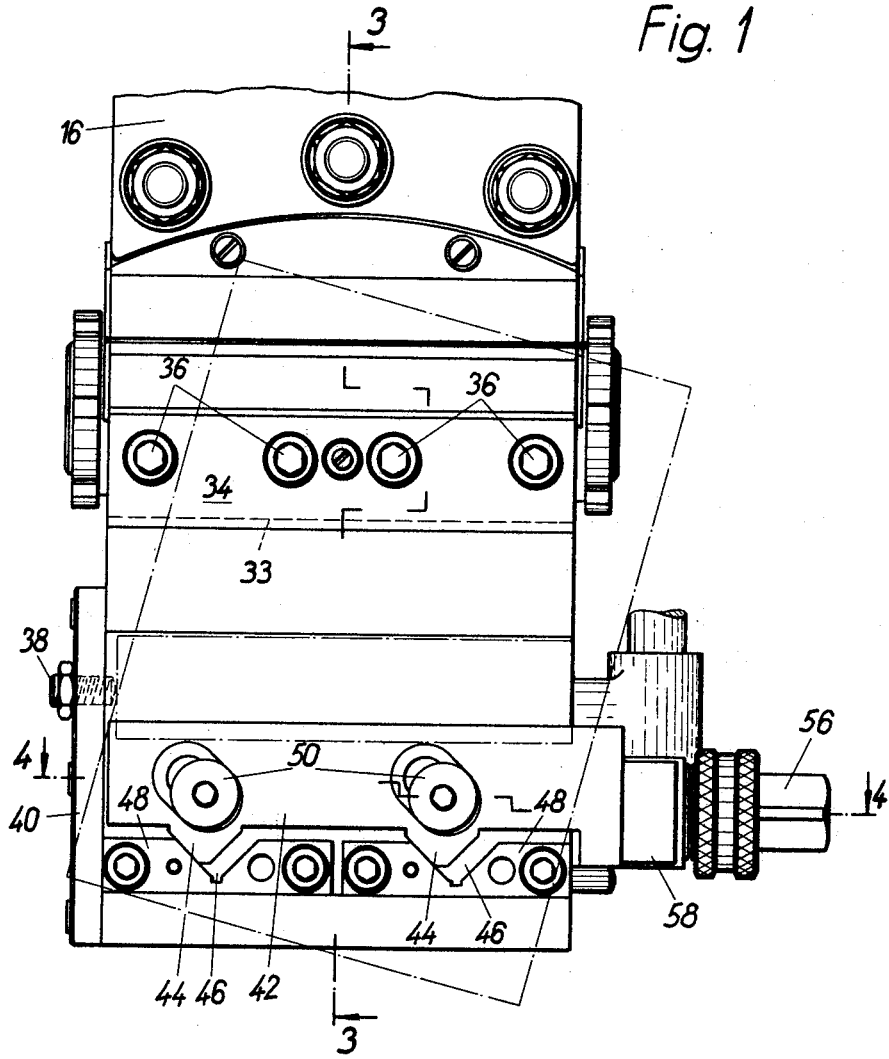

The following is a specification of the subject matter of the invention.

My invention relates to tool-supporting means of a planing machine, more particularly, of a planing machine having a reciprocating work table, a stationary support, and a slidable tool support thereon. In planing machines of this type a tool carrying member is mounted on the slidable tool support for back-and-forth movement between a cutting position for the cutting stroke of the work table and a retracted position for the return stroke of the work table.

In modern planing machines of this type it is often necessary to adjust the tool on the tool-carrying member to a definite position relatively thereto. This adjusting operation is difficult and time-consuming, if carried out in the planing machine because the tool mounted on the slidable tool support by means of the tool-carrying member is of restricted accessibility.

It is an object of my invention to facilitate this adjusting operation by the provision of means which permit this adjusting operation to be carried out at a separate work station rather than in the planing machine itself. It is a further object of the invention to provide simple and effective means which permit a bracket to which the tool is adjustably clamped to be attached to the tool-carrying member in a clearly defined relative position thereto and to detach the bracket from the tool-carrying member, the attachment and detachment being effected by a simple manipulation.

Further objects of my invention and the features of novelty will appear from the following detailed description and explanation of a preferred embodiment of my invention illustrated in the accompanying drawings. It is to be understood, however, that my invention is in no way limited or restricted to such details but is capable of numerous modifications within the scope of the appended claims.

Figure 2:
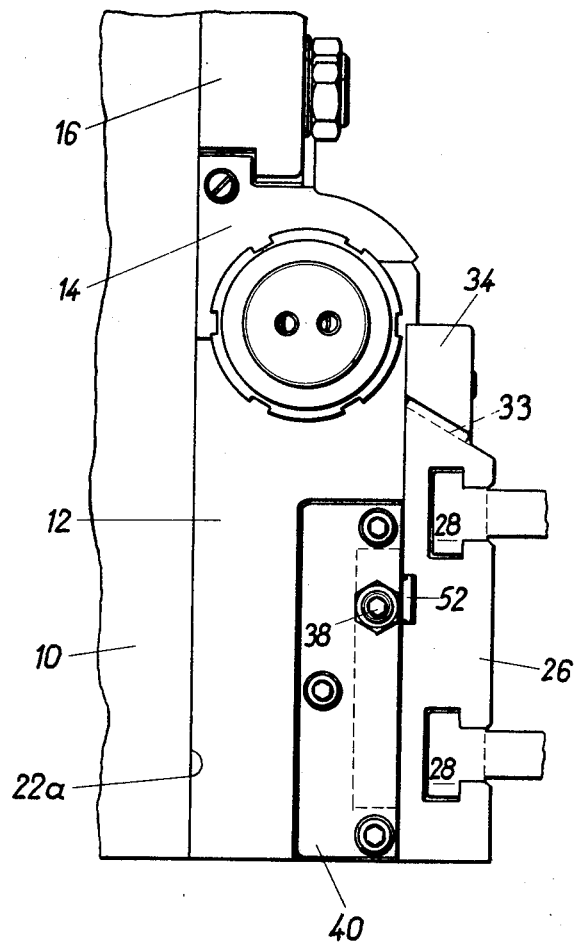
Figure 3:
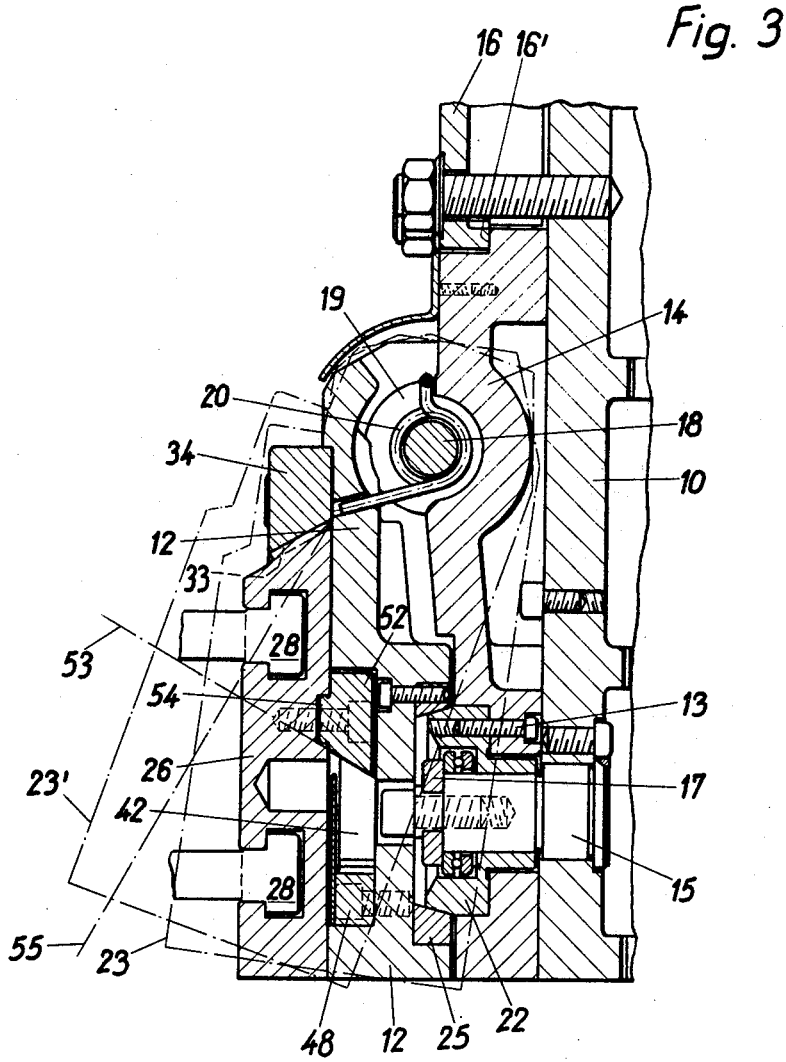
Figure 4:
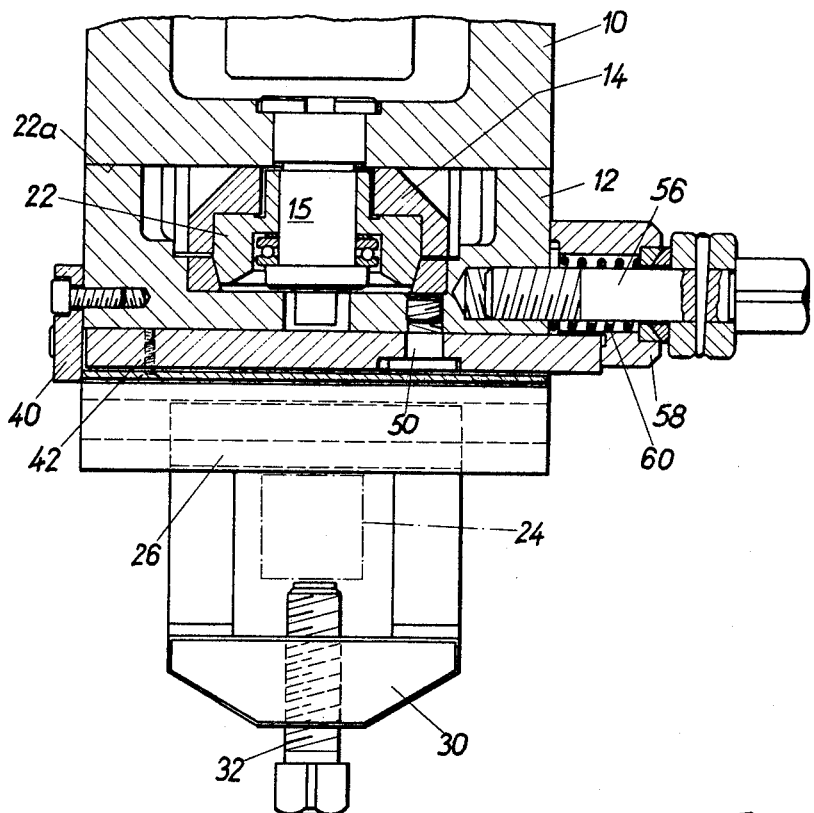
Figure 5:
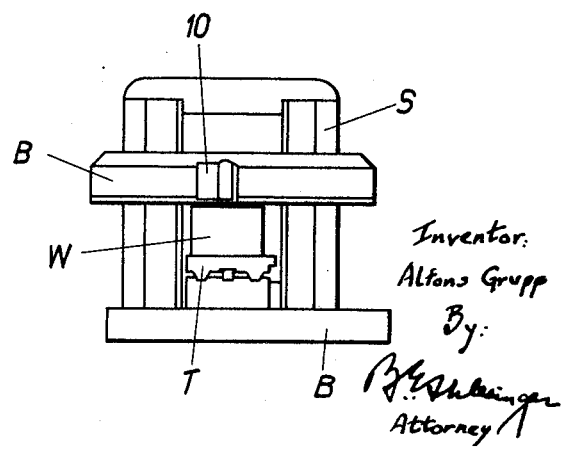

In the drawings:

FIG. 1 is an elevation of the novel tool-mounting means, the bracket to which the tool is clamped being detached and removed, FIG. 2 is a side view of the tool-mounting means of FIG. 1, FIG. 3 is a section taken along the line 3—3 of FIG. 1, FIG. 4 is a sectional view taken along the line 4—4 of FIG. 1 and FIG. 5 is a diagrammatic elevation of a planing machine to which the invention is applicable.

Referring to FIG. 5 the base B of a planing machine carries a gate-shaped stationary support S on which a horizontal beam B is slidably mounted for up-and-down feed motion. This beam is provided on its front face with a horizontal guide way on which a slidable tool-support 10 is mounted for horizontal feed movement. A bed B' carries a horizontal guide way extending at right angles to and below the beam B. A reciprocating work table T carrying a work piece W fixed thereto is slidably mounted on the guide way and reciprocated by suitable driving means. The tool carried by the slidable tool-support 10 performs the cutting operation on the work piece W during the forward cutting strokes of the table T and is withdrawn from the work piece W during the return strokes of the table T.

The slidable tool-support 10, FIG. 3, has a vertical front face on which a socket member 14 is mounted for adjustment about a horizontal pin 15. This pin is inserted in a horizontal bore of the support 10 and projects forwardly therefrom. A sleeve 22 surrounding the projecting end of pin 15 is inserted in a suitable aperture provided in the socket member 14 and is fixed to the socket member by screws such as 13. The socket member is held in position on the pin 15 by a washer 17 fixed to the front end of pin 15 by a suitable screw. An antifriction thrust bearing may be inserted between the washer 17 and the sleeve 22 as shown in FIG. 3. The socket member 14 can be angularly adjusted about the axis of pin 15 and held in an adjusted position by a clamping member 16. The clamping member 16 is attached to the support 10 above the upper end of the socket member 14 by suitable clamping screws and engages a shelf 16' of the socket member.

The socket member is formed with a pair of spaced coaxially aligned ears 19 in which a horizontal pivot pin 18 is so mounted that its ends project out of the ears. On these ends of the pin 18 there are journalled the lateral parallel webs of a tool-carrying member 12 having in section a transverse U-shaped profile as shown in FIG. 4. The webs of this member straddle the socket member 14. Between the ears 19 the pin 18 is surrounded by a helical torsion spring 20. One end of this spring engages the tool-carrying member 12 and its other end engages the socket member 14. The spring is so biassed that it tends to pivot the tool-carrying member 12 in anti-clockwise direction with reference to FIG. 3 thereby tending to hold the webs of the member 12 in abutment against the vertical surface 22a of the support 10, as shown in FIG. 4. This is the cutting position of the tool-carrying member 12 in which it is held during the cutting strokes of the work table T. During the return strokes thereof the tool-carrying member 12 is swung about pivot pin 18 to the position 23 or to the position 23' both indicated by dash-dotted lines in FIG. 3. In these positions the tool is withdrawn frm the work piece during the return strokes of the work table T. As the means for effecting the back-and-forth swinging movement of the tool-carrying member 12 between the cutting position and the retracted position 23 or 23' are well known in the art, they need not be shown or described.

In order to brace the member 12 in its cutting position against lateral components of the cutting force exerted by the work on the tool, an annular member 25 having an internal conical face is so attached to the member 12 in co-axial relationship to the sleeve 22 that its internal conical face engages a complementary conical face of the sleeve 22 as shown in FIG. 3.

The cutting tool 24 is adjustably clamped to a bracket 26 which is so mounted on the tool-carrying member 12 that it can be easily detached therefrom. In the embodiment shown, this bracket 26 is formed by a plate which is seated on the front face of the tool-carrying member 12 and in the cutting position thereof is vertically disposed. In its front face this plate is provided with horizontal T-grooves in which feet 28 on the ends of arms of yoke members 30 are guided (FIGS. 3, 4). Each of these yoke members straddles the stem of the cutting tool 24 and carries a clamping screw 32 for clamping this stem against the plate-shaped bracket 26 as shown in FIG. 4. The means 28, 30 and 32 constitute holding means for holding the tool 24 on the bracket 26 in an adjusted position.

The bracket 26 is detachably secured to the member 12 in a predetermined invariable position by suitable seating surfaces provided on the member 12 and by complementary seating surfaces on the bracket 26. The seating surfaces provided in the member 12 are formed by the front face of the member 12 and by the side faces of teeth on a rack 34 disposed above the front face and in front thereof. The teeth of the rack face in downward direction inclined towards the front face as indicated at 33 in FIG. 3. The rack 34 is fixed to the tool-carrying member 12 by screws 36, FIG. 1. The complementary seating faces provided on the bracket 26 are formed by the upright rear face thereof and by the tooth sides of a series of rack teeth provided on the top surface of bracket 26 as shown at 33 in FIG. 3. This top surface is inclined in a direction away from the rear face. Preferably the tooth sides are plane faces.

Suitable releasable clamping means are mounted on the tool-carrying member 12 for rigidly but detachably securing the bracket 26 thereon. These clamping means and the bracket 26 are so designed that the clamping means are capable of exerting on the bracket a clamping force directed upwardly and rearwardly whereby the clamping force will urge the complementary seating surfaces of the bracket 26 into contact with the seating surfaces of the member 12.

In the embodiment shown the clamping means include a slide 42 shown in FIGS. 1 and 3 and formed by a substantially rectangular elongated vertical plate which is guided on the front face of the tool-carrying member 12 for limited displacement in an inclined direction. For this purpose the bottom edge of the slide 42 is provided with lugs 44 which engage recesses 46 provided in the top edges of elongated vertically disposed plates 48 fixed to the front face of member 12 below the slide 42. The slide 42 is provided with inclined oblong holes through which headed bolts 50 project. The threaded stems of these bolts 50 are screwed into tapped bores provided in the member 12, as shown in FIG. 4. The left-hand sides of the recesses 46 with reference to FIG. 1 extend parallel to the oblong holes provided in the slide 42.

A horizontal bar 52 is fixed by suitable screws to the rear face of bracket 26 and is accommodated by a recess provided in the front face of member 12. The bottom face of the bar 52 forms an abutting surface for engagement by the slide 42 and is so inclined as to coincide with a plane 53 extending at right angles to a line 55, FIG. 3, which substantially bisects the angle formed by the top surface and by the rear surface of the bracket 26.

Suitable means are mounted on the member 12 for moving the slide 42 into and out of abutting relationship with the abutment means 52. In the embodiment shown these means comprise a horizontal screw 56 threaded into a tapped bore provided in the member 12 and extending through a clamping sleeve 58 which engages the right-hand side face of slide 42 with reference to FIGS. 1 and 4. A helical pressure spring 60 surrounds the screw 56 and is inserted between the member 12 and an internal shoulder of sleeve 58. This spring will withdraw the clamping sleeve 58, when the screw 56 is loosened. As a result, the slide 42 will slide downwardly and to the right on the bolts 50 with reference to FIG. 1 and will thus release the bar 52 and the bracket 26 fixed thereto for downward displacement, so that the operator can withdraw the bracket 26 and the cutting tool clamped thereto from the member 12 and may replace the removed bracket by a new bracket bearing a re-sharpened cutting tool 24. For this purpose the new bracket 26 is first loosely inserted below the rack 34 in abutment against a stop screw 38, FIG. 1, which is fixed in an adjusted position on a plate 40 laterally secured to the member 12. This stop screw 38 serves to determine the approximate position of the bracket 26 upon insertion by the operator. Thereafter the operator will tighten the screw 56 thereby moving the slide 42 upwardly and towards the left with reference to FIG. 1 for engagement of the bottom surface of the bar 52. As a result, the slide 42 exerts a force on the bar 52 substantially in a direction parallel to the line 55. This force will urge the rear face of the bracket 26 into full contact with the front face of member 12 and will urge the rack teeth of bracket 26 into full engagement with the rack 34, whereby the bracket 26 is positively moved into a predetermined position in which it is securely held against the cutting force exerted by the tool on the bracket. During this operation the bracket is slightly withdrawn from stop screw 38 into the position indicated in FIG. 1 by dash-dotted lines.

In modern planing machines the feed motions in the vertical and horizontal direction are frequently imparted to the support 10 under the control of a punched tape or other record carrier or by suitable templates or the like. Therefore, it is necessary for the cutting edge of the tool 24 to be so adjusted as to assume a predetermined definite position with reference to the support 10. As the location of the cutting edge is changed whenever the tool is re-sharpened, a frequent re-adjustment of the cutting tool 24 relative to the support 10 becomes unavoidable. This re-adjustment is difficult and time-consuming when performed on the planing machine itself because of the limited accessibility of the cutting tool. This applies particularly to large machines having wide work tables which limit the accessibility of the tool. With the present invention, however, the operator can easily and quickly remove the bracket 26 together with the holding means 28, 30, 32 and the cutting tool as a rigid unit and replace this unit with a new unit in which the re-sharpened cutting tool has been previously exactly adjusted in a separate work station equipped with the required adjusting facilities such as suitable gauges. As this work station may be located at some convenient place, the adjusting operation can be carried out with great accuracy and at leisure, while the planing machine is in operation with a re-sharpened tool.

The easy replacement of the rigid tool unit is possible because the clamping means 42 is releaseable independently of the holding means 28, 30, 32.

It will be obvious to those skilled in the art to which the invention appertains that the same may be incorporated in several different constructions. The accompanying drawings, therefore, are submitted merely as showing a preferred example of the invention. More particularly, my invention is in no way limited to a structure in which the back-and-forth movement of the tool-carrying member between the cutting position and the retracted position of the tool is a pivotal motion.

What I claim is:

1. In a planing machine having a reciprocating work table, a stationary support, a tool support slidable thereon, and a planing tool which, during the forward stroke of said table, is in its cutting position and during the return stroke of said table in a retracted position, the combination comprising a tool-carrying member, means for movably mounting said member on the slidable tool support for a back-and-forth movement enabling said tool to take up either its cutting or its retracted position, said member being provided with seating surfaces, a bracket seated and easily detachably mounted on said member and provided with complementary seating surfaces engaging said first-mentioned seating surfaces, releasable clamping means for rigidly but detachably securing said bracket on said tool-carrying member, and holding means on said bracket for rigidly holding said tool on said bracket in an adjusted position, said seating surfaces determining the position of said bracket on said tool-carrying member, and said clamping means being releasable independently of said holding means, whereby said bracket, said tool and said holding means are removable as a rigid unit from said tool-carrying member.

2. The combination claimed in claim 1 in which said tool-carrying member is provided with an upright front face and with a rack thereabove and in front thereof having teeth facing in a downward direction inclined towards said front face, said front face and the sides of said teeth constituting said first mentioned seating surfaces, said bracket being provided with an upright rear face and with a series of rack teeth on its top surface, said top surface being inclined in a direction away from said rear face, said rear face and the sides of said last mentioned rack teeth constituting said complementary seating surfaces, and said clamping means including first abutment means being mounted on said member for engagement with said bracket, said bracket having second abutment means engaged by said first abutment means whereby said clamping means are capable of exerting a clamping force on said bracket directed upwardly and rearwardly, whereby said force will urge said complementary seating surfaces of said bracket into contact with said seating surfaces of said member.

3. The combination claimed in claim 2 in which said clamping means comprises a slide, means for guiding said slide on said member in an inclined direction parallel to said front face, said second abutment means being located in the path of said slide and provided with an abutting surface for engagement by said slide, said surface coinciding with a plane extending at right angles to a line substantially bisecting the angle formed by said top surface and said rear face of said bracket, and means mounted on said member for moving said slide into and out of abutting relationship to said second abutment means.

References Cited

UNITED STATES PATENTS

| 1,681,408 | 8/1928 | Johannesmeyer et al. | 90—54 |
| 1,931,730 | 10/1933 | Klay | 90—52 |
| 2,489,942 | 11/1949 | Walter | 90—54 |

FOREIGN PATENTS

| 645,304 | 7/1962 | Canada. |

GIL WEIDENFELD, Primary Examiner

U.S. Cl. X.R.

82—36